United States Patent
Matsunaga et al.

(10) Patent No.: US 8,599,283 B2
(45) Date of Patent: Dec. 3, 2013

(54) IMAGE CAPTURE APPARATUS AND IMAGE CAPTURING METHOD

(75) Inventors: Kazuhisa Matsunaga, Fussa (JP);
Masaru Onozawa, Akishima (JP);
Kouichi Nakagomi, Tokorozawa (JP);
Tetsuji Makino, Oume (JP)

(73) Assignee: Casio Computer Co., Ltd., Tokyo (JP)

( * ) Notice: Subject to any disclaimer, the term of this patent is extended or adjusted under 35 U.S.C. 154(b) by 303 days.

(21) Appl. No.: 12/943,229

(22) Filed: Nov. 10, 2010

(65) Prior Publication Data

US 2011/0109754 A1     May 12, 2011

(30) Foreign Application Priority Data

Nov. 11, 2009   (JP) ................ P2009-257574

(51) Int. Cl.
*H04N 5/235* (2006.01)
*H04N 5/225* (2006.01)
*G03B 7/00* (2006.01)

(52) U.S. Cl.
USPC ............. 348/229.1; 348/218.1; 348/362

(58) Field of Classification Search
USPC .................................. 348/363–368
See application file for complete search history.

(56) References Cited

U.S. PATENT DOCUMENTS

| | | | |
|---|---|---|---|
| 5,828,793 A * | 10/1998 | Mann | 382/284 |
| 6,965,410 B1 | 11/2005 | Yamagishi | |
| 7,161,629 B2 * | 1/2007 | Suzuki et al. | 348/362 |
| 7,609,320 B2 | 10/2009 | Okamura | |
| 7,852,401 B2 | 12/2010 | Hamamura et al. | |
| 8,189,069 B2 * | 5/2012 | Ogawa | 348/229.1 |
| 8,248,480 B2 | 8/2012 | Matsunaga et al. | |
| 2005/0220359 A1 | 10/2005 | Sun et al. | |
| 2010/0157078 A1 * | 6/2010 | Atanassov et al. | 348/222.1 |
| 2010/0271498 A1 * | 10/2010 | Hwang et al. | 348/222.1 |

FOREIGN PATENT DOCUMENTS

| | | | |
|---|---|---|---|
| JP | 2000-209476 A | | 7/2000 |
| JP | 2002-223386 | * | 8/2002 |
| JP | 2002-223386 A | | 8/2002 |

(Continued)

OTHER PUBLICATIONS

Japanese Office Action dated Oct. 25, 2011 (and English translation thereof) in counterpart Japanese Application No. 2009-257574.
Korean Office Action dated Dec. 28, 2012 (and English translation thereof) in counterpart Korean Application No. 10-2010-0111648.
Taiwanese Office Action dated Apr. 19, 2013 (and English translation thereof) in counterpart Taiwanese Application No. 099138598.

*Primary Examiner* — Sinh Tran
*Assistant Examiner* — Christopher K Peterson
(74) *Attorney, Agent, or Firm* — Holtz, Holtz, Goodman & Chick, PC

(57) ABSTRACT

An image capture apparatus includes: an image capturing unit; a first image capture controller configured to control the image capturing unit to capture a set of a plurality of images while changing exposure time for each of the images; a second image capture controller configured to obtain a plurality of sets of the images; an addition combination section configured to perform image alignment on the images contained in each of the sets and to perform addition combination on the aligned images to generate a combined image; a combination controller configured to control the addition combination section to perform the image alignment and the addition combination for each of the sets to obtain a plurality of combined images; a selector configured to evaluate the combined images and to select one of the combined images most highly evaluated as a selected image; and a storage configured to store the selected image.

5 Claims, 6 Drawing Sheets

(56) References Cited

FOREIGN PATENT DOCUMENTS

| JP | 2007-281548 A | 10/2007 |
| JP | 2008-042746 A | 2/2008 |
| JP | 2008-271529 A | 11/2008 |
| JP | 2009-021909 A | 1/2009 |
| KR | 10-2005-0084580 A | 8/2005 |
| TW | 200943934 A1 | 10/2009 |

* cited by examiner

IMAGE CAPTURE APPARATUS AND IMAGE CAPTURING METHOD

CROSS-REFERENCE TO THE RELATED APPLICATION(S)

The present application is based upon and claims priority from prior Japanese Patent Application No. 2009-257574, filed on Nov. 11, 2009, the entire content of which are incorporated herein by reference.

BACKGROUND

1. Field of the Invention

Embodiments described herein are related to an image capture apparatus, an image capturing method and a computer readable medium containing an image capture program.

2. Description of the Related Art

Recently, a method for image capture in a place of poor illumination, such as night view image capture, is proposed in which addition combination is performed of a succession of images captured with a fast shutter speed without emitting a flash to record a single image frame. An example of such method is disclosed in JP-A-2008-271529. According to the image capturing method disclosed therein, since an image can be recorded without raising the sensitivity of the image capture element, problems such as those caused by thermal noise can be eliminated even in a night view or the like where the light from a flash does not reach far enough.

However, with the technique described above, since a sequence of successive image capture processing and addition combination processing is employed, if the successive image capture processing fails due to careless operation then often a satisfactory image does not arise even when addition combination is performed, and a photographer must re-perform image capture operation every time failure occurs.

In cases where the circumstances of image capture are such that there is a limited chance for image capture, it is often impossible to "re-perform the image capture operation", and there is a probability that the right chance is lost.

SUMMARY

According to a first aspect of the present invention, there is provided an image capture apparatus including: an image capturing unit; a first image capture controller configured to control the image capturing unit to capture a set of a plurality of images while changing exposure time for each of the images; a second image capture controller configured to control the first image capture controller to perform capturing of the set of the images for a plurality of times to obtain a plurality of sets of the images; an addition combination section configured to perform image alignment on the images contained in each of the sets and to perform addition combination on the aligned images to generate a combined image; a combination controller configured to control the addition combination section to perform the image alignment and the addition combination for each of the sets to obtain a plurality of combined images; a selector configured to evaluate the combined images and to select one of the combined images most highly evaluated as a selected image; and a storage configured to store the selected image.

According to a second aspect of the present invention, there is provided an image capture apparatus including: an image capturing unit; a first image capture controller configured to control the image capturing unit to capture a set of a plurality of images while changing exposure time for each of the images; a second image capture controller configured to control the first image capture controller to perform capturing of the set of the images for a plurality of times to obtain a plurality of sets of the images; a selector configured to evaluate the images contained in each of the sets and to select one of the sets most highly evaluated as a selected set; an addition combination section configured to perform image alignment on the images contained in the selected set and to perform addition combination on the aligned images to generate a combined image; and a storage configured to store the selected image.

According to a third aspect of the present invention, there is provided an image capturing method including: capturing a set of a plurality of images while changing exposure time for each of the images for a plurality of times to obtain a plurality of sets of the images; performing image alignment on the images contained in each of the sets; performing addition combination on the aligned images to generate a combined image; performing the image alignment and the addition combination for each of the sets to obtain a plurality of combined images; evaluating the combined images and to select one of the combined images most highly evaluated as a selected image; and storing the selected image.

According to a fourth aspect of the present invention, there is provided an image capturing method including: capturing a set of a plurality of images while changing exposure time for each of the images for a plurality of times to obtain a plurality of sets of the images; evaluating the images contained in each of the sets and to select one of the sets most highly evaluated as a selected set; performing image alignment on the images contained in the selected set; performing addition combination on the aligned images to generate a combined image; and storing the selected image.

According to a fifth aspect of the present invention, there is provided a non-transitory computer readable medium containing a software program for causing a computer included in an image capture apparatus including an image capturing unit to execute a process including: controlling the image capturing unit to capture a set of a plurality of images while changing exposure time for each of the images for a plurality of times to obtain a plurality of sets of the images; performing image alignment on the images contained in each of the sets; performing addition combination on the aligned images to generate a combined image; performing the image alignment and the addition combination for each of the sets to obtain a plurality of combined images; evaluating the combined images and to select one of the combined images most highly evaluated as a selected image; and storing the selected image.

According to a sixth aspect of the present invention, there is provided a non-transitory computer readable medium containing a software program for causing a computer included in an image capture apparatus including an image capturing unit to execute a process including: controlling the image capturing unit to capture a set of a plurality of images while changing exposure time for each of the images for a plurality of times to obtain a plurality of sets of the images; evaluating the images contained in each of the sets and to select one of the sets most highly evaluated as a selected set; performing image alignment on the images contained in the selected set; performing addition combination on the aligned images to generate a combined image; and storing the selected image.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION

Figure 1:
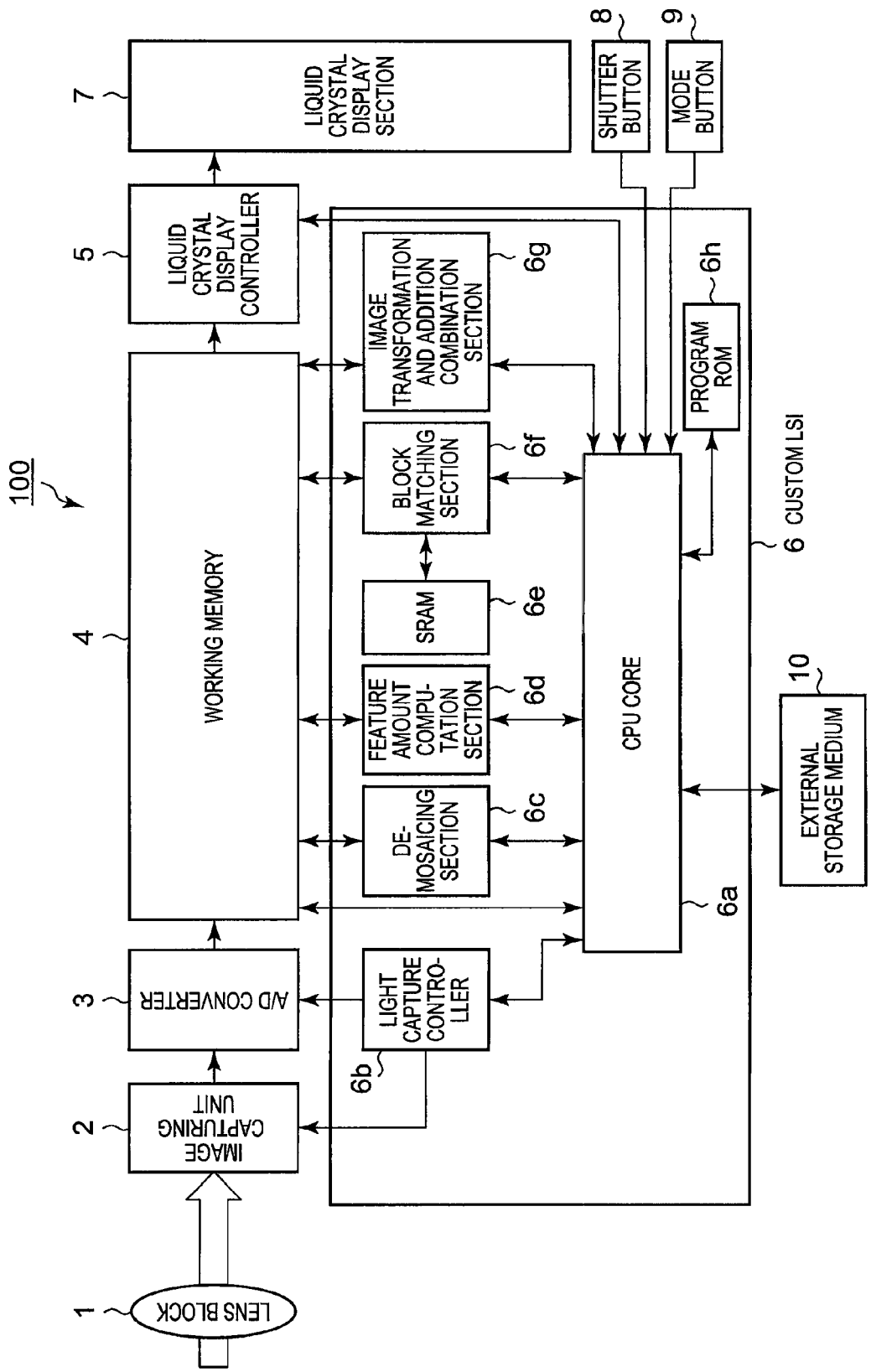
FIG. 1 is a circuit block diagram of a digital camera according to an exemplary embodiment described herein.

Embodiments according to the present invention will be described in detail with reference to the accompanying drawings. The scope of the claimed invention should not be limited to the examples illustrated in the drawings and those described in below.

FIG. 1 is a circuit block diagram showing an electrical configuration of a digital camera 100 according to an exemplary embodiment described herein. The digital camera 100 is a digital camera having generic functions, such as Auto Exposure (AE), Auto White Balance (AWB) and Auto Focus (AF). Namely, a lens block 1 includes an optical system with a zoom lens, a focusing lens (not shown in the figures) and the like, and a drive mechanism for driving the optical system.

An image capturing unit 2, configured with a Complementary Metal Oxide Semiconductor (CMOS) image capture element, is disposed on the optical axis of the lens block 1. An analogue signal representing an image from the image capturing unit 2 is converted into a digital signal by an A/D converter 3 and stored in a working memory 4 configured by Dynamic Random Access Memory (DRAM) or the like.

A custom Large Scale Integration (LSI) 6 is a circuit section that performs processing, such as pedestal clamping, on the image signal stored in the working memory 4, then converts this into a luminance (Y) signal and chrominance (UV) signal, and performs digital signal processing in order to improve image quality by white balance processing, edge enhancement processing, pixel interpolation processing and the like. In particular, in image capture mode, each time one frame's worth of data (image data) is stored in the working memory 4 it is converted into a video signal, and output to a liquid crystal display controller 5. The liquid crystal display controller 5 drives a liquid crystal display section 7 according to the video signal transmitted from the working memory 4, reproducing as a display of images successively in live-view.

The custom LSI 6, when reproducing images on the liquid crystal display section 7 in live-view, detects as a trigger for operation of the shutter button 8 by a user. When such operation is detected, the custom LSI 6 compresses the image data temporarily stored in the working memory 4, and stores the compressed image data on an external storage medium 10 as a still image file of a specific format, such as JPEG.

The custom LSI 6 as configured according to the embodiments described herein includes a Central Processor Unit (CPU) core 6a, a light capture controller 6b, a de-mosaicing section 6c, a feature amount computation section 6d, a Static Random Access Memory (SRAM) 6e, a block matching section 6f, an image transformation and addition combination section 6g, and a program ROM 6h.

The CPU core 6a controls each of the above sections configuring the custom LSI 6 by executing processing, described below, according to a program stored on the program ROM 6h, while utilizing the working memory 4. The light capture controller 6b controls the operational timing of the image capturing unit 2 and the A/D converter 3 so as to function as an electronic shutter.

The de-mosaicing section 6c performs de-mosaicing processing on a RAW image (uncompressed image). The feature amount computation section 6d is employed when detecting specific images, such as faces of people, in captured images, and for determining whether or not a specific change is present in the specific image detected (in the case of images relating to faces of people this might be whether the face has changed into a smile, or the like). The block matching section 6f employs the SRAM 6e as a working area and performs block matching between respective images as required when performing image positional alignment, described below. The image transformation and addition combination section 6g performs addition combination processing of images.

The shutter button 8, a mode button 9 and the external storage medium 10 are connected to the CPU core 6a of the custom LSI 6. The shutter button 8 is configured by a button switch having a two-stage operation stroke, these being a first stage operation stroke (half press) and a second stage operation stroke (full press). The mode button 9 transmits an instruction signal for switching between image capture and reproduction modes according to user operation. In image capture modes an instruction signal for a more precise image capture mode is output, such as "successive image dynamic range expansion mode" or "HDR (high dynamic range) mode".

The external storage medium 10 is a removable recording medium, such as an SD card. Image data of an image captured in an image capture mode, such as normal image capture mode, or "successive image dynamic range expansion mode", is stored on the external storage medium 10. During reproduction, image data read out from the external storage medium 10 is supplied to the liquid crystal display controller 5 via the CPU core 6a and a reproduced image is displayed on the liquid crystal display section 7.

Program AE data configuring a program line chart expressing combinations of aperture numbers and shutter speeds (shutter durations) corresponding to appropriate exposure, these giving appropriate exposure values for during image capture, are stored on the program ROM 6h. Explanation follows regarding operation of the present exemplary embodiment configured according to as described above. When a user operates the mode button 9 and sets the image capture mode to "successive image dynamic range expansion mode", the CPU core 6a of the custom LSI 6 commences processing according to a program stored on the program ROM 6h, as shown in the flow chart of FIG. 2.

First, the CPU core 6a controls the liquid crystal display controller 5 so as to successively display in live view captured images on the liquid crystal display section 7 (step A1). Next, the CPU core 6a determines whether or not the shutter button 8 has been half-pressed (step A2). If the shutter button 8 has been half-pressed then various processing is executed to control photometrical processing, focusing processing, white balance processing and the like on the image being captured, the image capturing unit 2 and the A/D converter 3 (step A3). Then an exposure value of aperture number and shutter speed (or exposure time) is computed based on the brightness of the image obtained by the photometrical processing of step A3

(referred to below as appropriate exposure value), and the periodicity of a rolling shutter is set to accord with this exposure value.

With the computed appropriate exposure value taken as being an exposure value with a shift amount of 0, denoted 0 EV (Exposure Value), with an exposure value shifted to half of this appropriate exposure value denoted −2, an exposure value shifted in the opposite direction to two times −2 EV, and an exposure value shifted to 2 times the appropriate exposure value denoted +2 EV, exposure times (referred to below as 0 EV duration, −2 EV duration, and +2 EV duration) according to respective exposure values are computed with the aperture fixed (step A4).

Then when the shutter button 8 is fully pressed in order for the user to capture an image, determination at step A5 is YES. Accordingly, the CPU core 6a proceeds from the processing of step A5 to the processing of step A6, and 5 sets of image are successively captured with a rolling shutter method, wherein 1 set is 3 times of image capture with exposure times of −2 EV duration, +2 EV duration, and 0 EV duration (step A6). Namely, image capture is performed successively 3×5=15 times, and 15 frames of RAW image corresponding to the 15 times worth of image capture are thereby stored on the working memory 4.

Figure 3:
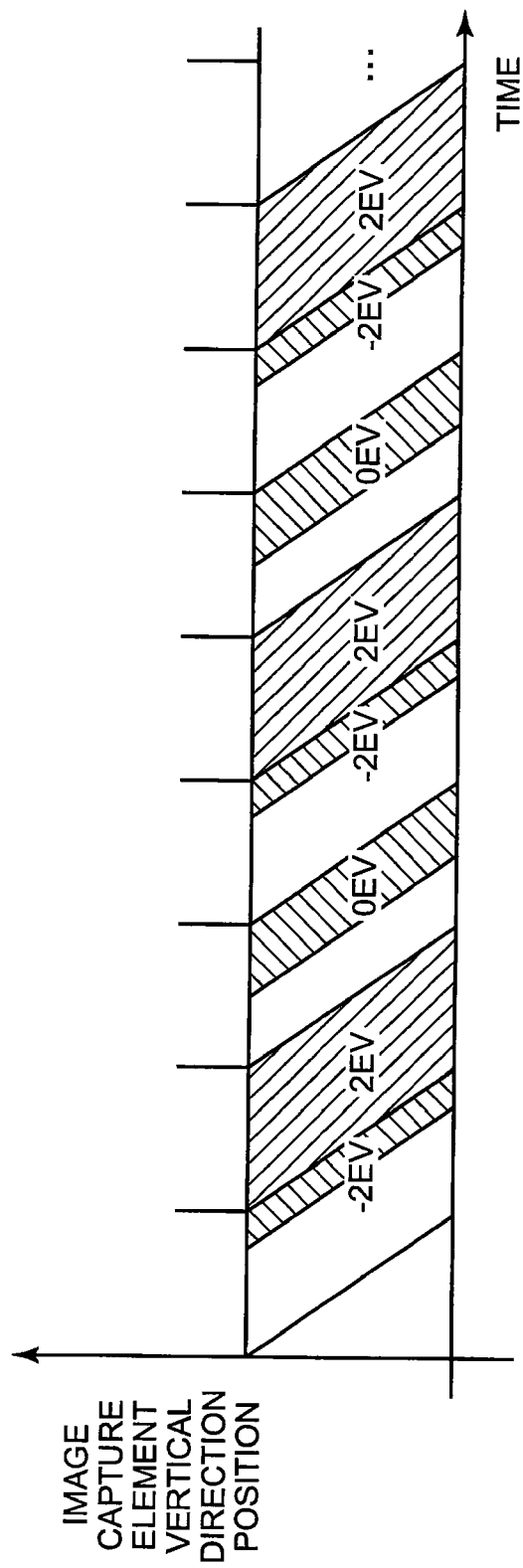
FIG. 3 is a diagram showing timing of image capture for each set.

FIG. 3 is a diagram showing the timing of image capture for 1 set as described above. In FIG. 3, the −2 EV duration is set to be ½ the 0 EV duration. The +2 EV duration is set to be 2 times the 0 EV duration.

The reason that the image capture sequence is set as −2 EV duration, +2 EV duration, 0 EV duration is to shorten the image capture duration per set.

In order to perform positional alignment in addition combination processing, compressed YUV images of 8 bits are then generated for all of the 15 frames of RAW image stored in the working memory 4, and correction of γ curve is performed on each of the YUV images so as to fit within data of 8 bits when addition combined (step A7).

Next, gain correction is performed on the luminance (Y) such that the exposure value of the compressed YUV image of the image captured with 0 EV duration (referred to below as the 0 EV compressed image) is equivalent to the exposure value of the compressed YUV image of the image captured with +2 EV duration (referred to below as the +2 EV compressed image). Positional alignment is then performed on the +2 EV compressed image, with the above gain corrected 0 EV compressed image as the reference image (step A8).

More precisely, since each of the sets comprises a −2 EV image, +2 EV image, and 0 EV image, at step A8, first positional alignment is performed on the 0 EV compressed image and the +2 EV compressed image captured immediately previous thereto. When this is being performed, the 0 EV compressed image is first corrected in γ curve, then corrected with 4 times gain, then the γ curve is restored to the original such that the exposure value of the 0 EV compressed image is made equivalent to the exposure value of the +2 EV compressed image. A movement vector is then derived for performing comparison by block matching on the corrected 0 EV compressed image and +2 EV compressed image. A projection transformation matrix expressing the positional relationship between the two images is then derived from the derived movement vector.

Next, gain correction is performed for the luminance (Y) such that the exposure value of the 0 EV compressed image becomes equivalent to the exposure value of the compressed YUV image captured with −2 EV duration (referred to below as the −2 EV compressed image). Positional alignment is then performed on the −2 EV compressed image, with the 0 EV compressed image gain corrected as described above as the reference image (step 9).

More precisely, at step 9 positional alignment is performed of the 0 EV compressed image and the −2 EV compressed image previously captured in the same frame. When this is being performed, the −2 EV compressed image is first corrected in γ curve, then corrected with 4 times gain, then the γ curve is restored to the original such that the exposure value of the −2 EV compressed image is made equivalent to the exposure value of the 0 EV compressed image. A movement vector is then derived for performing comparison by block matching on the corrected −2 EV compressed image and the 0 EV compressed image. A projection transformation matrix expressing the positional relationship between the two images is then derived from the derived movement vector.

Then at the next step A10, determination is made as to whether or not positional alignment of images by step A8 and step A9 has been completed for all of the sets. The processing loop step A8→step A9→step A10→step A8 is repeated until positional alignment is complete for all of the sets.

Accordingly, in the present exemplary embodiment in which 5 sets of image capture is performed, the processing loop step A8→step A9→step A10→step A8 is repeated 5 times, and positional alignment is thereby completed for all of the sets.

Evaluation is then made regarding the positional alignment for the 5 sets that have completed positional alignment, and determination is made as to which has the highest evaluation, namely whether or not there is a set that has a high degree of matching in which positional alignment has been successful (step A11). Determination here as to whether or not positional alignment of the images has been successful is, for example, with positional alignment being assessed as having succeeded when the degree of matching of the −2 EV compressed image and the +2 EV compressed image to the 0 EV compressed image during block matching is 90% or more, and positional alignment is assessed as having failed when the degree of matching is less than 90%.

In cases where there is a set with which positional alignment has succeeded, further determination is made as to whether there are in fact plural such sets (step A13). When it is determined that there are plural such sets, the set with the least positional displacement between the respective images of the 0 EV compressed image and the −2 EV compressed image is selected from these plural sets (step A14).

When determination at step A13 is that there are not plural sets in which positional alignment has succeeded and only one thereof, processing proceeds to step A15 without passing through step A14.

YUV images are then generated from the RAW images, with individual image development processing being executed (step A15).

Figure 4:
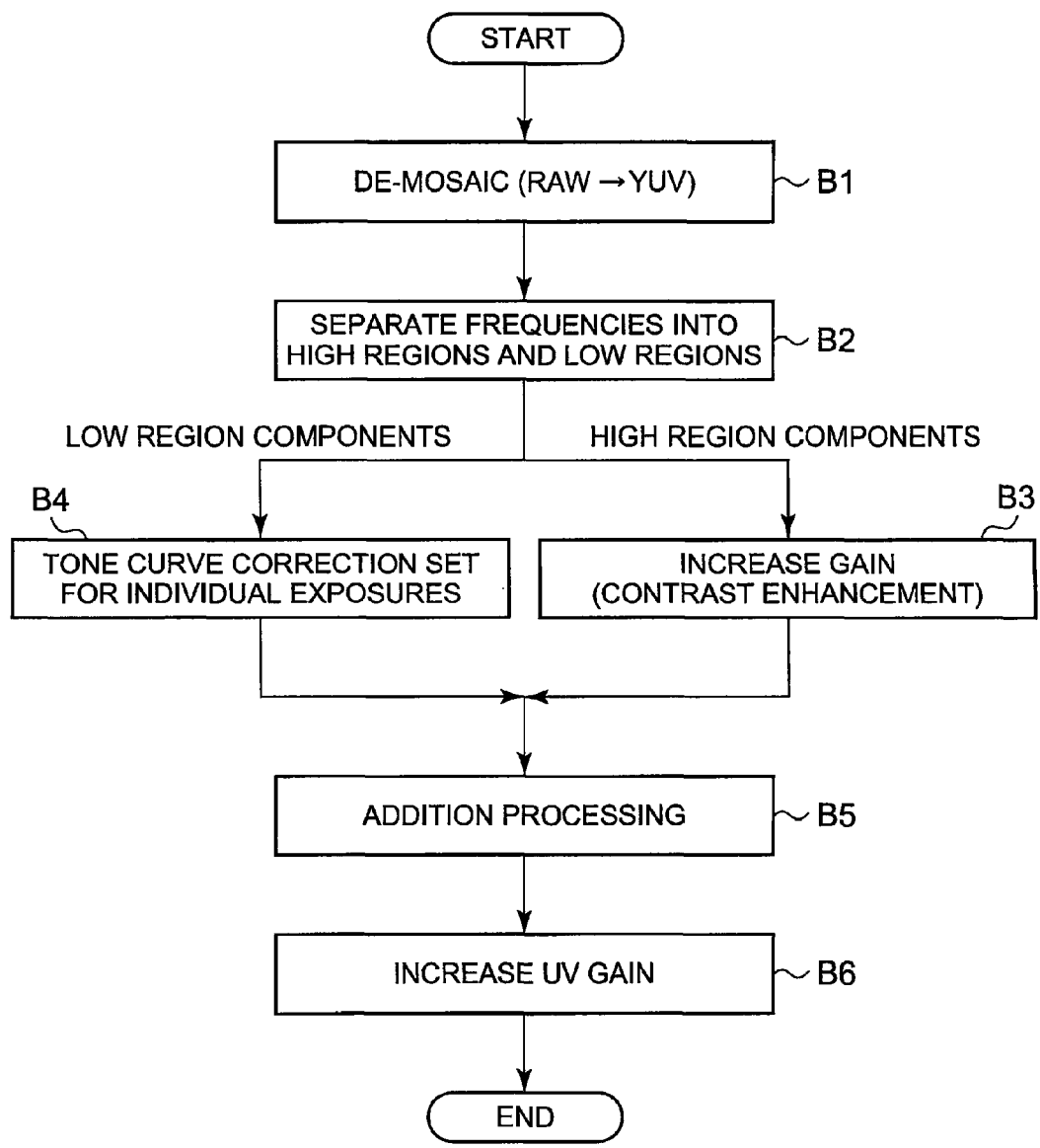
FIG. 4 is a flow chart showing a processing sequence of processing employed in individual image development (processing employed on the final resulting image).

FIG. 4 is a flow chart showing a processing sequence of the individual image development processing (step A15). First de-mosaicing processing is performed by the de-mosaicing section 6c on the 3 RAW images corresponding to the 0 EV compressed image, the +2 EV compressed image, and the −2 EV compressed image, respectively, contained in the selected set, and converting into YUV images (step B1). In this de-mosaicing processing, regions of high frequency (high region components) and regions of low frequency (low region components) are separated out in each of the images (step B2). The contrast is then enhanced by increasing the gain in the high region components (step B3). Tone curve correction set for each exposure is performed on the low region components (step B4).

Figure 5:
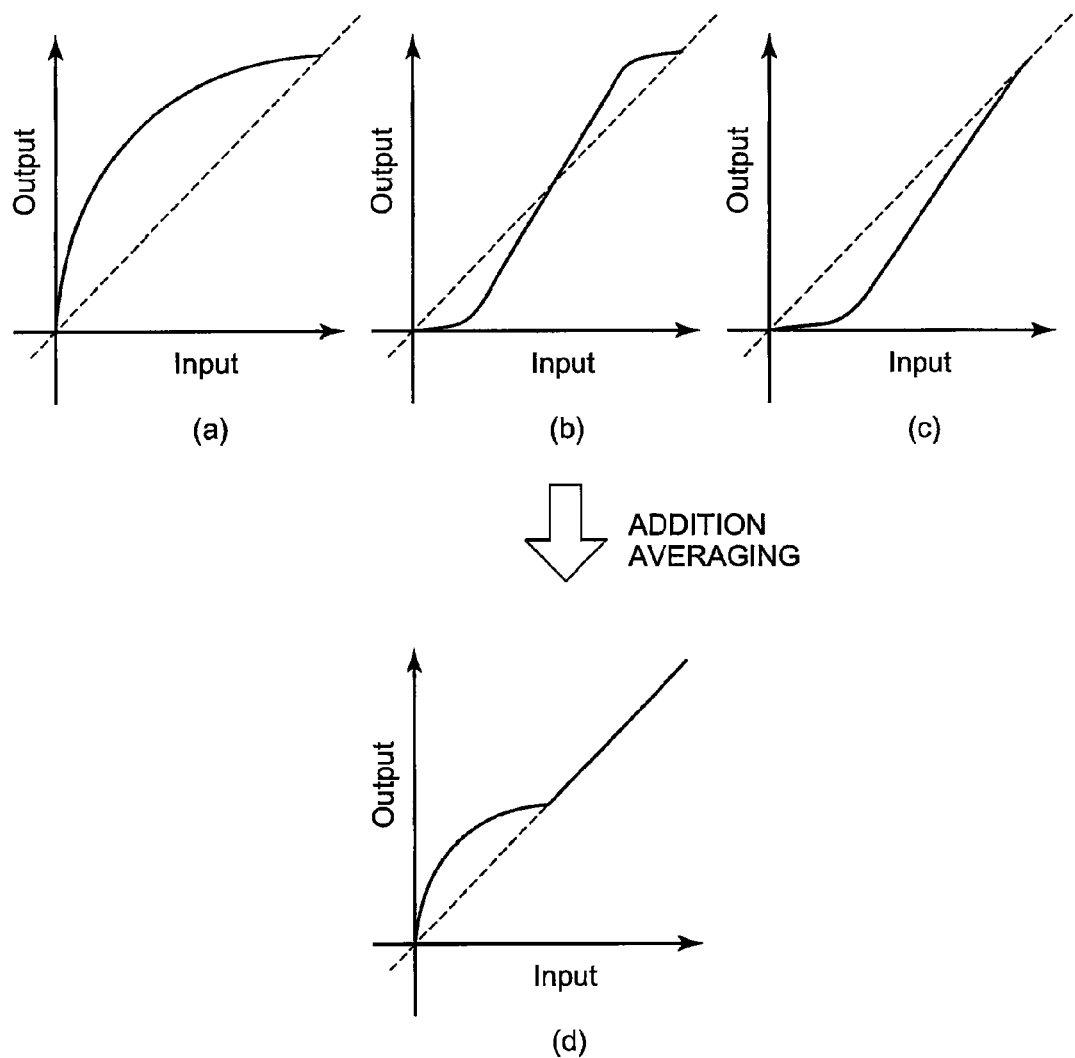
FIG. 5A, FIG. 5B and FIG. 5C are graphs showing examples of tone curves set for individual exposure at step B4.
FIG. 5D is a graph showing a tone curve of an addition combined image.

FIG. 5 is a diagram with graphs showing an example of tone curves of step B4 set for individual exposures. The tone curves are set for the RAW image corresponding to the −2 EV compressed image, as shown in FIG. 5C, and for the RAW image corresponding to the 0 EV compressed image, as shown in FIG. 5B, so as to have a linear shaped appropriate portion where the exposure is appropriate, with a high slope of the appropriate exposure portion, such that the contrast is raised. In the portions where the exposure is not appropriate, the slope is reduced, and color deviation noise is suppressed.

For the RAW image corresponding to the +2 EV compressed image, as shown in FIG. 5A, a large γ curve is set, with the end point of the γ curve set according to the central value of luminance of the histogram of the RAW image corresponding to the 0 EV compressed image.

FIG. 5D shows a tone curve of an addition combined image in which each of the RAW images corresponding to the +2 EV compressed image, the 0 EV compressed image, and the −2 EV compressed image have been addition combined.

Addition processing is performed on each of the RAW images that have been separation processed into low region components and high region components (step B5). Processing is also performed to increased the UV gain for the image after addition processing (step B6).

Figure 2:
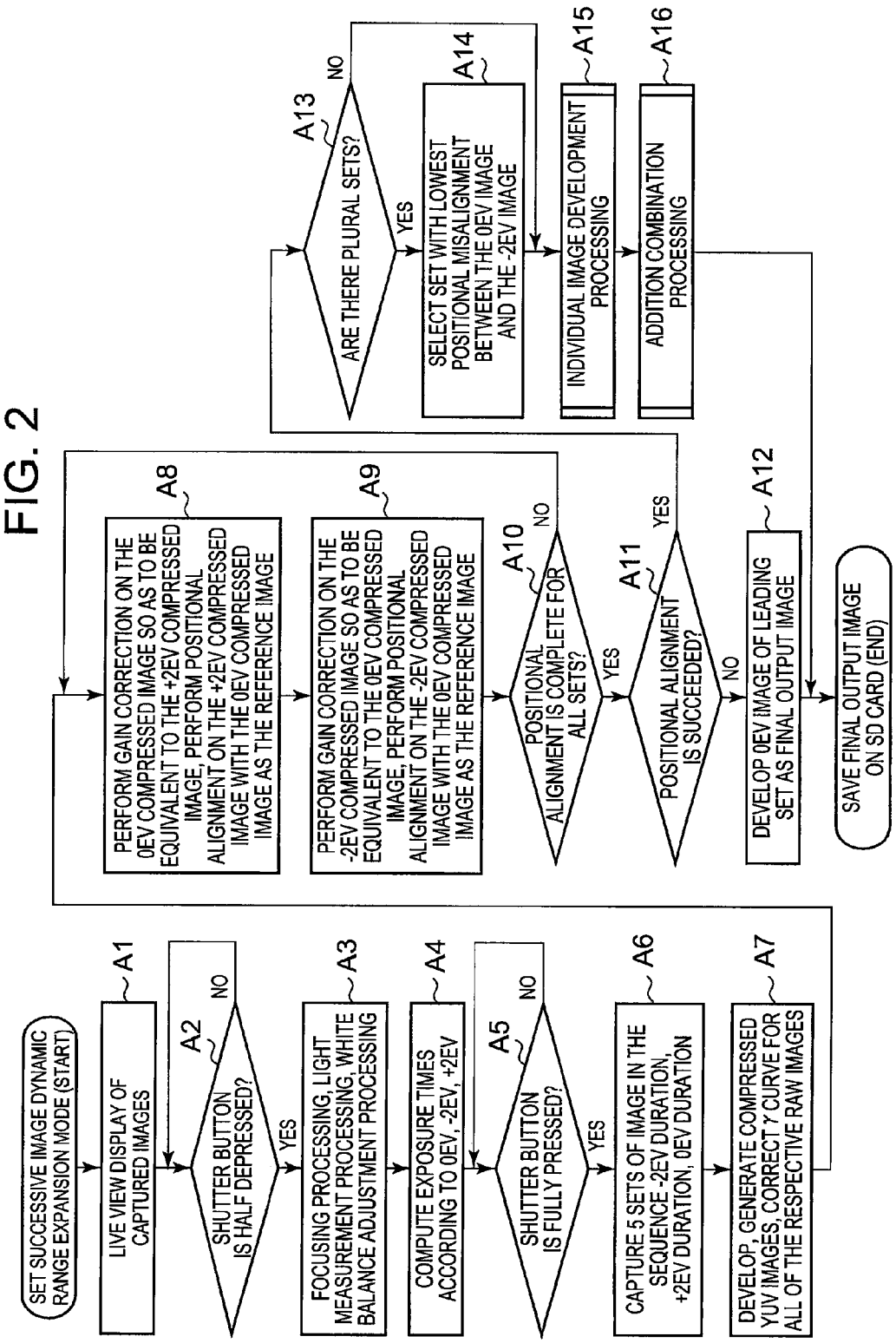
FIG. 2 is a flow chart showing a processing sequence in the same exemplary embodiment.

In this manner, when the respective development processing at step A15 of the flow chart in FIG. 2 is completed for the RAW images corresponding, respectively, to the 0 EV compressed image, the −2 EV compressed image, the +2 EV compressed image contained in the selected set, addition combination processing is executed in the next step A16 on the 3 frames of individual developed images.

Figure 6:
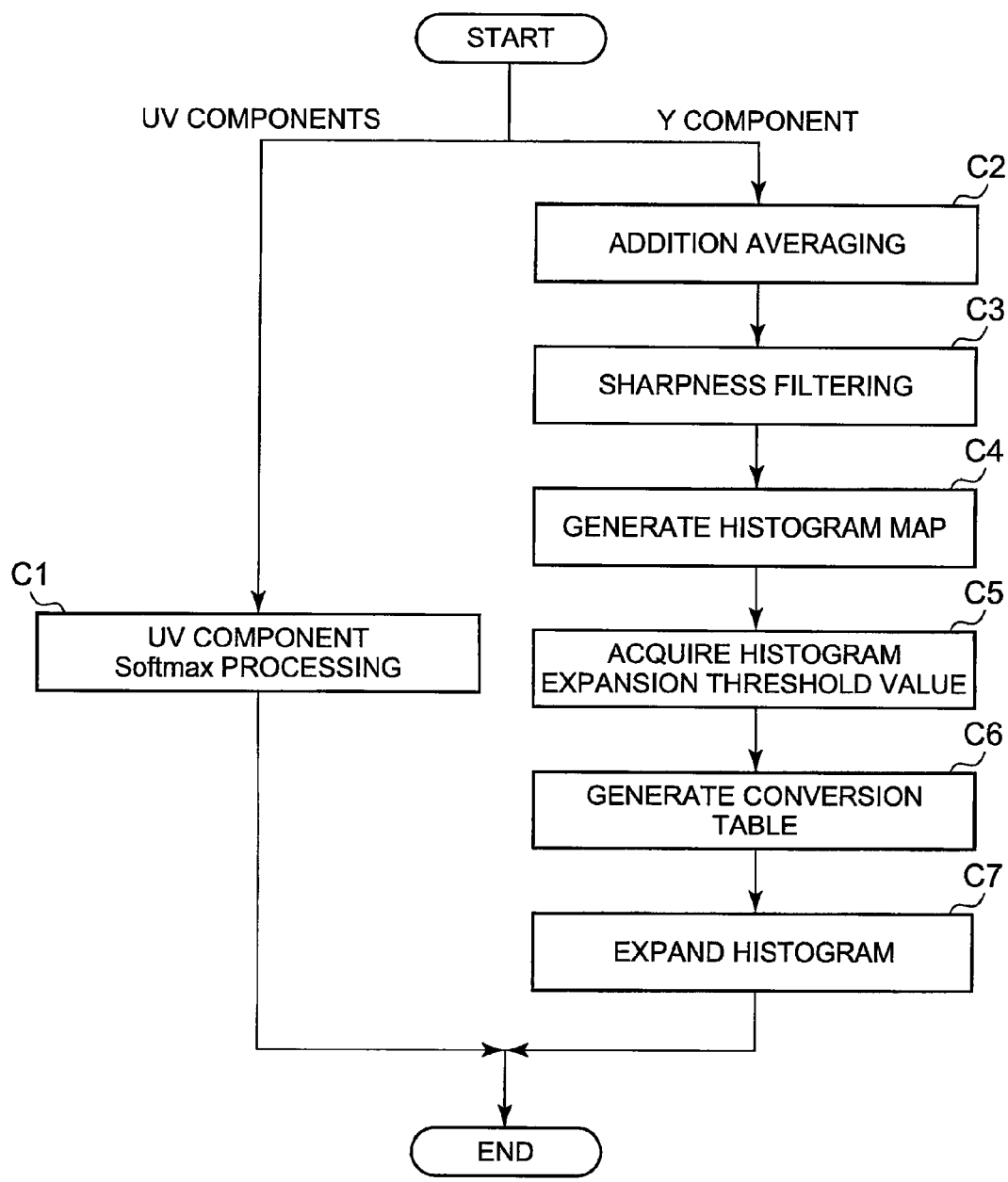
FIG. 6 is a flow chart showing a processing sequence of addition combination processing.

FIG. 6 is a flow chart showing details of the addition combination processing executed at step A16. In the flow chart, the processing is executed in steps C2 to C7 relating to the Y (luminance) component in the YUV images subject to addition combination, and only the processing of step C1 is performed relating to the U component (difference of luminance and blue component), and V component (difference of luminance and red component) thereof.

Namely, the 3 YUV image frames obtained at step A15 are addition averaged, and an addition combined image is generated (step C2). Sharpness filtering is then applied to the image obtained by addition averaging, and edge enhancement is applied to the Y component (step C3).

Then histogram expansion of the Y component is performed by the processing of steps C4 to C7 for the addition averaged image. Namely, first a histogram map is generated of the luminance value distribution of Y (step C4). However, since it would take significant generation computation time for a histogram map if performed by measuring all of the pixels, measurement is undertaken, for example, every 100th pixel.

Then the histogram expansion threshold value is acquired (step C5). Namely, the luminance value at the point of 0.5% of the histogram map surface area from the high luminance side is derived. A tone curve pixel conversion table is generated, namely a conversion table for linear conversion such that the expansion point on the high luminance side derived at step C5 becomes 255. The Y component of the addition combined image generated at step C2 is then expanded based on the generated conversion table (step C7).

For the UV components, combination by Softmax processing is performed (step C1). With respect to the U component, the output value calculated by the equation shown in the example below is taken as the Softmax output value (USoftmax) of U.

$$U\text{comp} = (U\text{ave} + U\text{max} \times \text{Coef})/(1+\text{Coef})$$

wherein:
Ucomp is taken as the Sofmax output value of U;
Uave is the average value of U;
Umax is the value of U in the image in which the sum of the absolute value of U and the absolute value of V is the greatest; and
Coef is an adjustment coefficient.

With respect to the V component, the output value calculated by the equation shown in the example below is taken as the Softmax output value of V (VSoftmax).

$$V\text{comp} = (V\text{ave} + V\text{max} \times \text{Coef})/(1+\text{Coef})$$

wherein:
Vcomp is the VSofmax output value;
Vave is the average value of V;
Vmax is the value of V in the image in which the sum of the absolute value of U and the absolute value of V is the greatest; and
Coef is an adjustment coefficient.

When the addition combination processing at step A16 of the flow chart of FIG. 2 has been completed, the addition combination processed image is saved as the final output image on the external storage medium 10, such as an SD card.

In the present exemplary embodiment, successive image capture of 5 sets is performed, with 3 times of image capture in a single set. Accordingly, when determining whether or not there is a successful set in which the positional alignment of step A11 has succeeded, there is an extremely high probability that a successful set exists. Consequently, there is an extremely small chance that a photographer would be compelled to re-operate the image capture operation, and the imposition on the photographer that accompanies retaking an image can be avoided.

Due to 5 sets of image being successively captured, with 3 times of image capture in a single set, there is an extremely high probability that the photographer has included the scene of the right chance to be captured in one or other of the sets. Accordingly, occasions of missing the right chance can be avoided.

As a result, image capture can be performed in a place of poor illumination without influence of camera shake on the captured image, without imposing a burden on the photographer and while still preventing missing the right chance for image capture.

However, as stated above, when as a result of the determination at step A11 determination is made that there is no set present in which positional alignment has succeeded, processing proceeds from step A11 to step A12. Then at step A12, the RAW image corresponding to the 0 EV compressed image of the leading set is development processed into a YUV image and processed into JPEG format as the final output image. This final output image is saved on the external storage medium 10, such as an SC card.

Examples of Modifications to the Exemplary Embodiment (1) In the present exemplary embodiment, configuration is made such that determination is made as to whether or not there is a set in which positional alignment has succeeded, the set with the least positional displacement of the images is selected from the sets for which positional alignment has succeeded, addition combination processing is then performed on the images of the single selected set and then this image saved. However, configuration may be made in which addition combination is performed on the images in all of the sets, evaluation is made of the combined images for each of the sets after addition combination, and the combined image with the highest evaluation selected from the plural combined images and saved.

In such cases too, in a similar manner to in the previously described exemplary embodiment, image capture can be performed in a place of poor illumination so as to be without influence of camera shake on the captured image, without imposing a burden on the photographer and while still preventing missing the right chance for image capture.

(2) Configuration may be made such that in the modification example (1), the presence or not or blurring of the subject is evaluated when evaluating the plural combination processed images, and the image with the least blurring of the subject is selected. By so doing, a sharp image in which there is no influence from blurring to the subject can be stored.

(3) In the present exemplary embodiment, configuration is made such that a single set is selected at step A14. However, configuration may be made such that detector that detects the brightness of capturing condition is provided, such as a light sensor, plural sets are selected when the detected brightness of the capturing condition by the detector is a specific value or lower, and then addition combination processing is performed on all of the images contained in the plural selected sets. By so doing, an image in which brightness is secured can be stored/saved when performing image capture in a place of poor illumination with a brightness of a specific value or lower.

(4) In the present exemplary embodiment, configuration is made at step A14 such that the set with the least alignment displacement between the 0 EV compressed image and the –2 EV compressed image is selected. However, configuration may be made such that at step A14 determination is made as to whether or not a face image is contained in the images within a set, and when determination is made that there is a face image contained, evaluation is performed, such as of the positional displacement, for the face image in the 0 EV compressed image and the –2 EV compressed image, and the set of images with the highest evaluation indicating the least positional displacement selected. By so doing, when image capture is performed with a person as the main subject in a place of poor illumination, an image in which the face of a person is of high quality can be stored.

In such cases too, configuration may be made such that, similar to in the modified example (1), addition combination is performed on the images in all of the sets, evaluation is made of the face images of the combined images for each of the sets after addition combination, and the combined image with the highest evaluation selected and saved from the plural combined images.

Although the embodiments according to the present invention have been described above, the present invention may not be limited to the above-mentioned embodiments but can be variously modified. Components disclosed in the aforementioned embodiments may be combined suitably to form various modifications. For example, some of all components disclosed in the embodiments may be removed or may be appropriately combined.

Additional advantages and modifications will readily occur to those skilled in the art. Therefore, the invention in its broader aspects may not be limited to the specific details and representative embodiments shown and described herein. Accordingly, various modifications may be made without departing from the spirit or scope of the general inventive concept as defined by the appended claims and their equivalents.

What is claimed is:

1. An image capture apparatus comprising:
an image capturing unit;
a first image capture controller configured to control the image capturing unit to sequentially capture a set of a plurality of images in a shorter exposure time that is shorter than an appropriate exposure time, in a longer exposure time that is longer than the appropriate exposure time, and in the appropriate exposure time;
a second image capture controller configured to control the first image capture controller to perform capturing of the set of the images for a plurality of times to obtain a plurality of sets of the images;
a selector configured to perform image alignment on the images contained in each of the sets and evaluate results of the image alignment, and to select one of the sets most highly evaluated as a selected set;
an addition combination section configured to perform addition combination on the images contained in the selected set, to generate a combined image; and
a storage configured to store the combined image.

2. The image capture apparatus of claim 1, further comprising:
a detector configured to detect a brightness of a capturing condition,
wherein the selector is configured to select two or more of the sets, and the addition combination section is configured to perform the addition combination on the images contained in the two or more of the sets, when the brightness detected by the detector is lower than a threshold value.

3. The image capture apparatus of claim 1, further comprising:
a determination section configured to determine whether or not a face image is contained in a captured image,
wherein the selector is configured to evaluate positional displacement of the face image in the sets of images and to select one of the sets most highly evaluated as the selected set, when the determination section determines that the face image is contained in the captured image.

4. An image capturing method comprising:
controlling an image capturing unit to sequentially capture a set of a plurality of images in a shorter exposure time that is shorter than an appropriate exposure time, in a longer exposure time that is longer than the appropriate exposure time, and in the appropriate exposure time;
performing capturing of the set of the images for a plurality of times to obtain a plurality of sets of the images;
performing image alignment on the images contained in each of the sets and evaluating results of the image alignment, to select one of the sets most highly evaluated as a selected set;
performing addition combination on the images contained in the selected set to generate a combined image; and
storing the combined image.

5. A non-transitory computer readable storage medium having an image capturing program stored thereon for controlling a computer of an apparatus comprising an image capturing unit to perform functions comprising:
controlling the image capturing unit to sequentially capture a set of a plurality of images in a shorter exposure time that is shorter than an appropriate exposure time, in a longer exposure time that is longer than the appropriate exposure time, and in the appropriate exposure time;
performing capturing of the set of the images for a plurality of times to obtain a plurality of sets of the images;

performing image alignment on the images contained in each of the sets and evaluating results of the image alignment, to select one of the sets most highly evaluated as a selected set;

performing addition combination on the images contained in the selected set to generate a combined image; and storing the combined image.

\* \* \* \* \*

UNITED STATES PATENT AND TRADEMARK OFFICE
CERTIFICATE OF CORRECTION

PATENT NO.        : 8,599,283 B2
APPLICATION NO.   : 12/943229
DATED             : December 3, 2013
INVENTOR(S)       : Kazuhisa Matsunaga Page 1 of 1

It is certified that error appears in the above-identified patent and that said Letters Patent is hereby corrected as shown below:

In the Specification

Column 7, line 24, change "increased" to --increase--.

Column 8, line 6, change "Sofmax" to --Softmax--.

Column 8, line 17, change "VSofmax" to --VSoftmax--.

Signed and Sealed this
Nineteenth Day of August, 2014

Michelle K. Lee
*Deputy Director of the United States Patent and Trademark Office*